Feb. 13, 1945.   G. G. SOMERVILLE   2,369,617
STRIP CUTTING MACHINE
Filed June 8, 1944   2 Sheets-Sheet 1
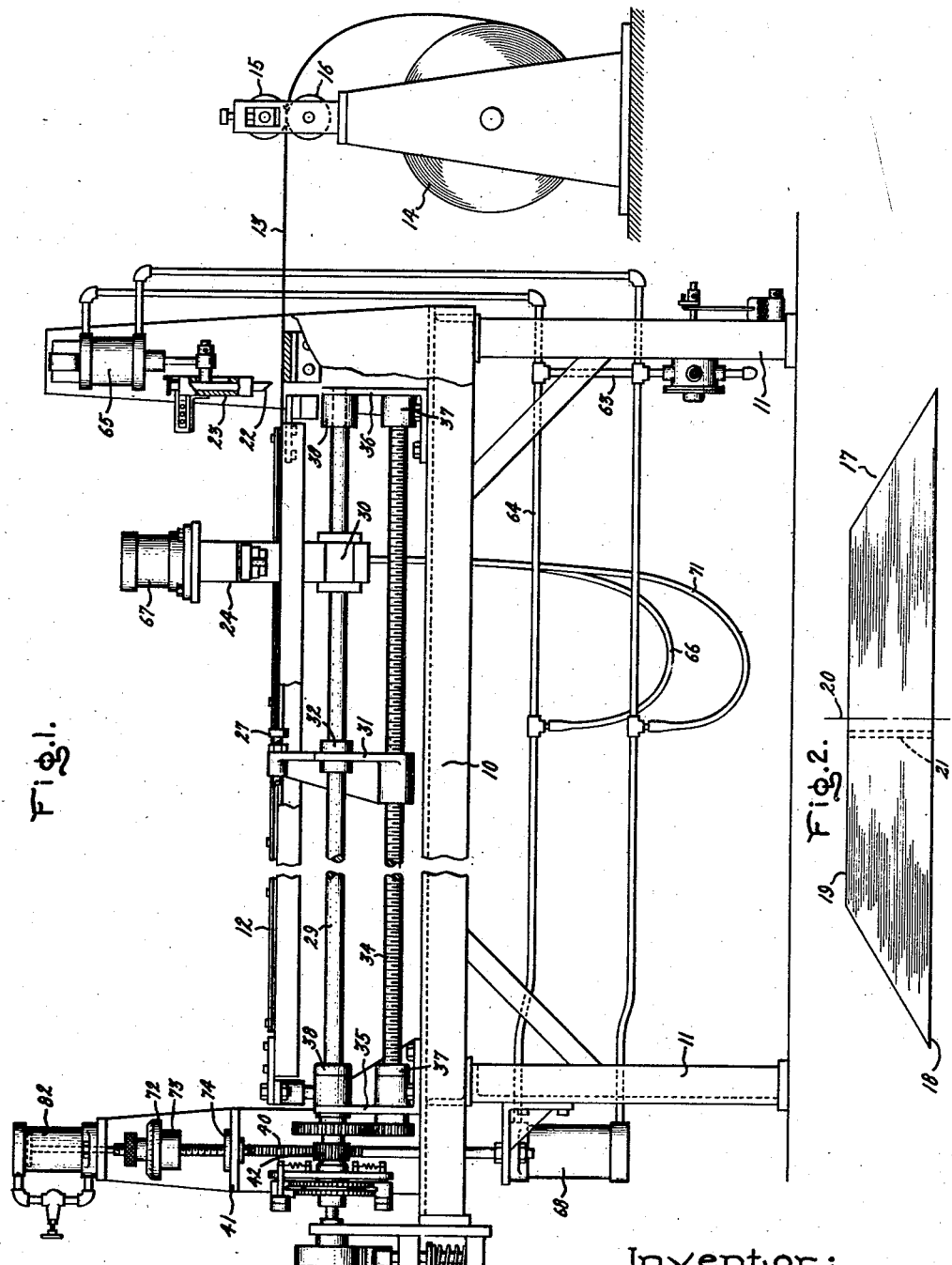
Inventor:
Gareth G. Somerville,
by Harry E. Dunham
His Attorney.

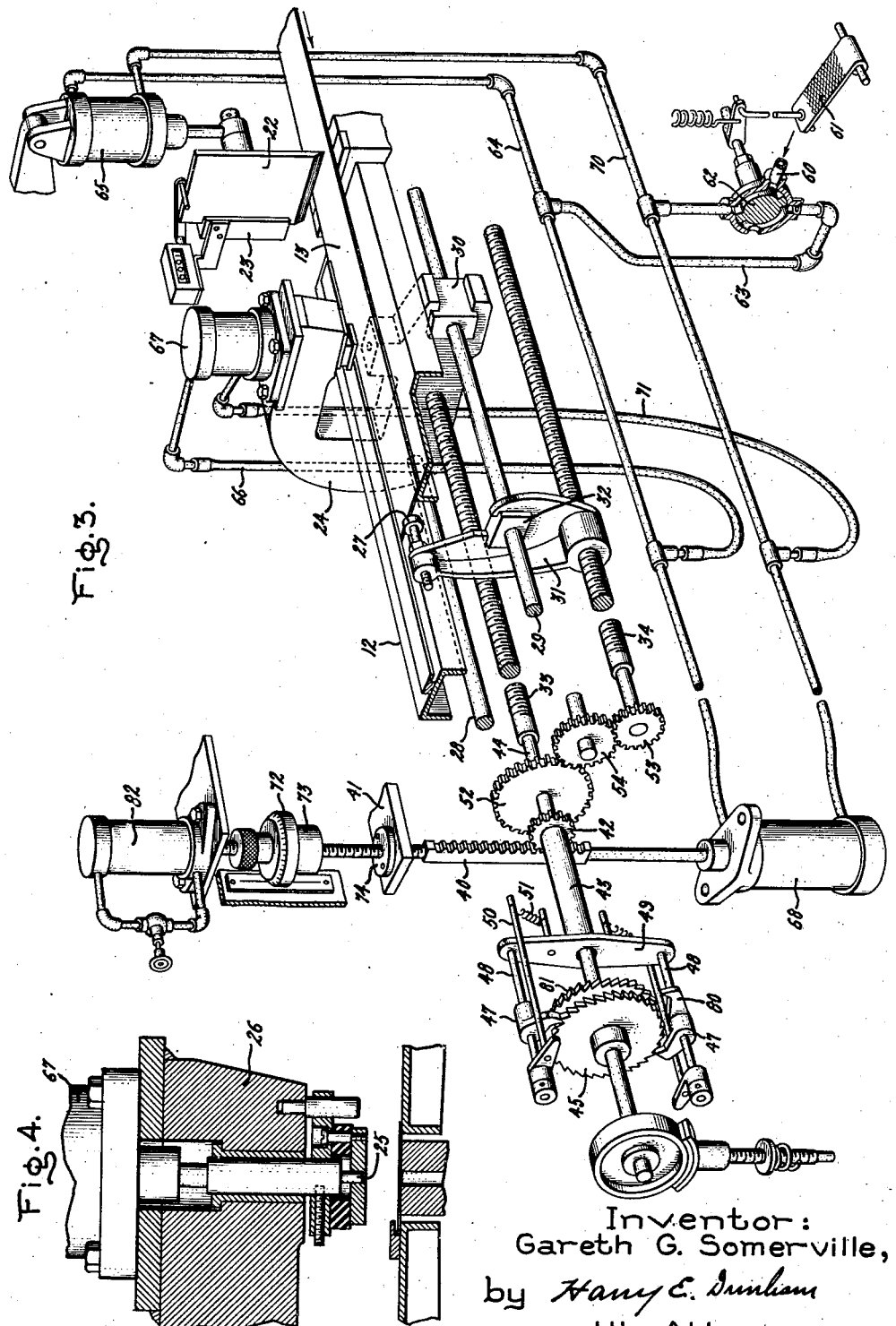

Patented Feb. 13, 1945

2,369,617

UNITED STATES PATENT OFFICE 2,369,617

STRIP CUTTING MACHINE

Gareth G. Somerville, Pittsfield, Mass., assignor to General Electric Company, a corporation of New York Application June 8, 1944, Serial No. 539,255

7 Claims. (Cl. 164—15)

My invention relates to a strip cutting machine, and to an index shearing and punching machine for punching a plurality of sheets of progressively different lengths from strip material.

An object of my invention is to provide an improved machine for cutting pieces of material of progressively different lengths from a strip of suitable material such as metal.

A further object of my invention is to provide an improved index shearing and punching machine for cutting sheets from strip material, the sheets having progressively different lengths and for punching holes in each of the sheets.

Further objects and advantages of my invention will become apparent from the following description referring to the accompanying drawings, and the features of novelty which characterize my invention will be pointed out with particularity in the claims annexed to and forming a part of this specification.

In the drawings, Fig. 1 is a side view of an index shearing machine formed according to my invention; Fig. 2 is an elevation of a stack of sheets of material having progressively different lengths which may be cut from the machine of Fig. 1; Fig. 3 is a perspective view of the operating members of the index machine of Fig. 1, and Fig. 4 is an enlarged view of the punch employed with the machine of Fig. 1.

Referring to Fig. 1 of the drawings, I have illustrated a machine including a supporting table 10 having legs 11. On the table 10 is provided a base member 12 having a surface upon which a strip 13, which is to be cut and punched may be placed. The strip 13 may be fed to the cutting machine in any suitable manner, and in Fig. 1 it will be seen that a roll 14 is provided from which is unwound the strip 13. The strip 13 may be of any suitable material such as metal and I have found that my improved index shearing machine has particular application in cutting sheets from strip 13 which is magnetic strip steel suitable for the formation of cores in electromagnetic induction apparatus. Rolls 15 and 16 are provided for flattening the strip 13 and for removing any burs as the strip is led into the index shearing machine.

My index shearing machine, as illustrated in Fig. 1, may be employed to cut sheets of magnetic material having progressively different lengths, such as a group of sheets as is illustrated in Fig. 2. This group 17 of sheets it will be seen has progressively different lengths with one length of sheet 18 on the bottom of the pile and a smaller sheet 19 on the top of the pile. The sheets are stacked with the longitudinal center line thereof being in registry indicated by the numeral 20. It will also be seen that holes 21 have been punched in each of the sheets, the holes 21 in each of the sheets being the same distance offset from the longitudinal center line of each sheet. Such a group of sheets of magnetic material 17 may be employed in any suitable manner such as being used to form a core portion as described in my application S. N. 536,748, filed May 22, 1944, and assigned to the same assignee as this present invention. In the description below I will describe my index shearing machine and its operation of cutting and punching sheets of progressively different lengths with a hole placed in the same relative position in each one of the sheets as is shown in Fig. 2, but it is to be understood that my improved index shearing machine may be employed to produce any other group of sheets of material having any suitable relative lengths and with holes placed in any suitable portion of each of the sheets.

Referring to Figs. 1 and 3 of the drawings, my improved index shearing machine includes a knife 22 which is movable vertically of the base surface 12 or toward or away from this surface. The knife 22 is supported in a relatively stationary support 23 within which the knife 22 is vertically movable. In order to punch a hole suitably positioned in the sheet as it is cut from the strip 13 by the knife 22, I provide a punch indicated generally by the numeral 24. Any suitable type of punch may be employed, and in Fig. 4 I have illustrated this specific punch which includes a movable punching element 25 which is supported in a supporting member 26. In order to control the length of the sheets as they are punched on the index shearing machine I provide a stop 27.

In order to cut the sheets from the magnetic strip 13 and to punch a hole in each of the sheets it will be seen that the knife 22 and the punch 24 are movable toward and away from the base surface 12 upon which the strip 13 is supported. Also, in order to punch progressively different lengths of sheets and to provide a hole offset from the longitudinal center line of each of the sheets the punch 24 and the stop 27 are movable with respect to the knife 22, the punch and stop being movable in a direction parallel with the base surface 12 which will normally be in a horizontal position when the knife 22 moves in a vertical direction.

In order to suitably support the punch 24, relatively stationary rods 28 and 29 are provided. A bearing 30 is supported in the punch support 26 so that although the punch support is relatively stationary in a vertical direction it is movable in a horizontal direction by sliding blocks 30 on the rods 28 and 29. The stop 27 is supported by an arm 31 which is in turn supported on the rods 28 through a bearing 32.

In order to move the stop 27 and punch 24 in a direction parallel with the base surface 12 which will normally be in a horizontal position I provide screws 33 and 34. As will be seen in Fig. 1 bearing support brackets 35 and 36 are provided which are mounted on the table 10, which bracket plates have bearings 37 for supporting the screw 34 for rotatable movement. Blocks 38 are also provided for supporting the rod 29. It will be understood that suitable similar supports are provided for supporting the rod 28, and bearings similar to the bearings 37 are provided for relatively rotatably supporting the screw 33.

In order to provide an arrangement for rotating the punch screw 33 and the stop screw 34 I provide a movable rack 40 which is supported in a plate 41 for vertical movement. The rack 40 is operatively connected to the screw 33 through a tooth wheel 42 which is supported on a sleeve 43. The sleeve 43 is in turn rotatably mounted on a rod 44 which is an integral extension of the screw 33. The rod 44 supports a wheel 45 which is connected to the sleeve 43 through a ratchet mechanism 47, the ratchet 47 being supported by arms 48 which are in turn supported through a bracket 49 which is carried by the sleeve 43. A rod 50 is resiliently forced by a spring 51 against the bracket of the ratchet 47 so as to cause it to mesh with the tooth wheel 45. It will be seen that movement of the rack 40 downwardly will cause the ratchet 47 to move over the teeth of the wheel 45 without moving the wheel. However, movement of the rack in an upwardly direction will cause the ratchet 47 to cooperate with the teeth of the wheel 45 so as to rotate the rod 44.

In order to operatively connect the stop screw 34 with the punch screw 33 I provide a tooth wheel 52 on the rod 44 which meshes with a toothed wheel 53 on an extension of the screw 33 through an idler pinion 54. It will be understood that the wheels 52, 53, and 54 may have any suitable relative relationship, and in the construction illustrated in the drawings the toothed wheel 52 has twice the circumference of the pinion 54 and the toothed wheel 53 so that there will be a two to one ratio of the gears, or the stop screw 34 will move twice the rate of the punch screw 33. With this particular ratio, the sheets may be cut of progressively different lenths and with the punch suitably set to place the hole offset of the longitudinal center line of each sheet, and the holes of each of the progressively different sheets will be placed the same distance offset from the longitudinal center line of each of the sheets to produce a group of sheets of the type illustrated in Fig. 2. However, it is to be understood that the hole may be punched in any other suitable position and the various sheets may have any other suitable relative dimensions.

In order to operate the shear 22 and the punch 24 to cut the sheets and punch the hole, I provide a pipe 60 which may be connected to any suitable source of air pressure. Then upon the operator depressing the foot pedal 61 a valve 62 will be moved so as to allow air pressure to be introduced through a pipe 63 and a pipe 64 to the top of a piston 65 which operates the shear 22. This will cause the shear 22 to move downwardly and shear off a sheet from the magnetic strip material. At the same time the air will be introduced through a flexible hose connection 66 to the top of a piston 67 which will cause the punch to move downwardly to punch the hole. Also, air will be introduced into the top of the rack piston 68 to cause the rack 40 to move downwardly and as has already been mentioned when the rack moves downwardly the ratchet 47 will move freely around the tooth wheel 45. When the operator removes his foot from the pedal 61 the valve 62 will return to the position as is illustrated in Fig. 3 and cause air to be admitted through a pipe 70 to the bottom of the shear piston 65 and the rack piston 68. Similarly through a hose connection 71 air will be admitted to the bottom of the punch piston 67 thus causing it to move upwardly or to be retracted.

Upward movement of the rack 40 will cause the ratchet 47 to bite into the teeth of the tooth wheel 45 thus causing the screw 33 to rotate a predetermined amount depending upon the amount of vertical movement of the rack 40. The movement of the screw 33 will cause the screw 34 to move, due to the two to one ratio, twice the amount of the screw 33. It will be understood that the amount of rotation of the screws 33 and 34 will determine how much bigger the next sheet will be from the immediately preceding sheet which has been cut.

In order to control the amount of movement of the punch and stop 27, I provide a vernier adjustment 72, the rotation of which will cause the nut 73 to be moved toward or away from a stop 74 on the support 41. It will be understood that the distance between the nut 73 and the stop 74 will determine the movement of the rack 40.

After the machine has been operated so that the stop 27 has moved as far as desired for the longest sheet in the stack as shown in Fig. 2, the machine may either be reset by rotating each of the screws 33 and 34 in the opposite direction to reset the stop 27 and punch 24 to the position to cut the short sheet in the stack, or the sheets may be cut with the stop and punch being indexed by moving them toward the shear 22 a predetermined amount each time depending upon rotation of the screws. The screws may be caused to rotate in the opposite direction by merely lifting the dog 47 and operatively connecting the dog 80 with a tooth wheel 81 which tooth wheel is attached to the rod 44 but with the teeth being oppositely disposed on the wheel 81 from the teeth in the wheel 45. It will therefore be seen that downward movement of the rack 40 will cause the dog 80 to cooperate with the tooth wheel 81 to move the screws 33 and 34. It will be recalled that when the rack 40 moves downwardly the punch and shear will also move downwardly, and so as to prevent rotation of the screws 33 and 34 at the instant the punch and shear are moving downwardly I provide a dash-pot 82 connected to the top of the rack 40 which will have such characteristics as to prevent the rack 40 from moving downwardly until after the punch and shear have punched and cut the sheet. This will prevent the sheet from buckling.

Although I have shown and described particular embodiments of my invention, I do not desire to be limited to the particular embodiments described, and I intend in the appended claims to cover all modifications which do not depart from the spirit and scope of my invention.

What I claim as new and desire to secure by Letters Patent of the United States is:

1. In a machine for cutting a plurality of sheets from a strip of material and for punching a hole in the sheets including a base having a surface upon which the strip may be supported, a knife edge movable perpendicularly to said base surface for cutting the strip material, stop means movable in a plane parallel to said base surface with respect to said knife so that different length sheets may be cut from said strip, punch means positioned between said knife and said stop means and movable perpendicularly to said base surface so that a hole may be punched in the sheets, and interconnected control means for respectively moving said stop means and said punch means with respect to said knife in a direction parallel to the plane of said base surface and for moving said stop means with respect to said punch means.

2. In a machine for cutting a plurality of sheets from a strip of material and for punching a hole in the sheets including a base having a surface upon which the strip may be supported, a knife edge movable perpendicularly to said base surface for cutting the strip material, stop means movable in a plane parallel to said base surface with respect to said knife so that different length sheets may be cut from said strip, punch means positioned between said knife and said stop means and movable perpendicularly to said base surface so that a hole may be punched in the sheets, and interconnected control means for respectively moving said stop means and said punch means with respect to said knife in a direction parallel to the plane of said base surface and for moving said stop means with respect to said punch means at a rate faster than said punch means is movable.

3. In a machine for cutting a plurality of sheets from a strip of material and for punching a hole in the sheets including a base having a surface upon which the strip may be supported, a knife edge movable perpendicularly to said base surface for cutting the strip material, stop means movable in a plane parallel to said base surface with respect to said knife so that different length sheets may be cut from said strip, punch means positioned between said knife and said stop means and movable perpendicular to said base surface so that a hole may be punched in the sheets, means for forcing said knife and punch means toward the strip for cutting and punching a hole therein and for retracting said knife and punch from the base surface, and interconnected control means for respectively moving said stop means and said punch means with respect to said knife in a direction parallel with the plane of said base surface while said punch and knife are being retracted from the base surface.

4. In a machine for cutting a plurality of sheets from strip material and for punching a hole in the sheets including a base having a surface upon which the strip may be supported, spaced knife and punch means movable perpendicularly with respect to said base surface for cutting the strip and punching a hole therein, stop means spaced from said punch means, screw means operatively connected to said stop means and said punch means for moving said stop and punch means in a direction parallel to said base surface and relative to said knife upon rotatable movement of said screw means, rack means, means including ratchet means for operatively connecting said rack means to said screw means, and operating means for moving said knife and punch toward said base surface and for moving said rack with said ratchet moving freely with respect to said screw means, said rack means being operatively connected to said screw means through said ratchet after said knife and punch have moved toward said surface to rotate said screw means and move said stop and punch means.

5. In a machine for cutting a plurality of sheets from strip material and for punching a hole in the sheets including a base having a surface upon which the strip may be supported, spaced knife and punch means movable perpendicularly with respect to said base surface for cutting the strip and punching a hole therein, stop means spaced from said punch means, screw means operatively connected to said stop means and said punch means for moving said stop and punch means in a direction parallel to said base surface and relative to said knife upon rotatable movement of said screw means, rack means, means including ratchet means for operatively connecting said rack means to said screw means, operating means for moving said knife and punch toward said base surface and for moving said rack with said ratchet moving freely with respect to said screw means, said rack means being operatively connected to said screw means through said ratchet after said knife and punch have moved toward said surface to rotate said screw means and move said stop and punch means, and adjustment means for varying the amount of movement of said rack so as to adjust the amount of movement of said stop and punch means.

6. In a machine for cutting a plurality of sheets from strip material and for punching a hole in the sheets including a base having a surface upon which the strip may be supported, spaced knife and punch means movable perpendicularly with respect to said base surface for cutting the strip and punching a hole therein, stop means spaced from said punch means, a pair of rotatable screws operatively connected to said stop means and said punch means respectively for moving said stop and punch means in a direction parallel to said base surface upon rotation of said pair of screws, means including rack means for rotating said punch screw means, and means including toothed wheels for operatively connecting said stop screw with said punch screw so that rotation of said punch screw will cause said stop screw to rotate at a faster rate.

7. In a machine for cutting a plurality of sheets from strip material and for punching a hole in the sheets including a base having a surface upon which the strip may be supported, spaced knife and punch means movable perpendicularly with respect to said base surface for cutting the strip and punching a hole therein, stop means spaced from said punch means, a pair of rotatable screws operatively connected to said stop means and said punch means respectively for moving said stop and punch means in a direction parallel to said base surface upon rotation of said pair of screws, rack means, means including ratchet and a toothed wheel for operatively connecting said rack to one of said screws, and a two to one ratio drive connection between said punch screw and said stop screw so that movement of said rack will cause said stop to move twice the distance of said punch.

GARETH G. SOMERVILLE.